United States Patent
Utamaru (10) Patent No.: US 12,010,118 B2
(45) Date of Patent: Jun. 11, 2024

(54) EQUIPMENT MANAGEMENT SYSTEM AND EQUIPMENT MANAGEMENT METHOD

(71) Applicant: KYOCERA Corporation, Kyoto (JP)

(72) Inventor: Tsudoi Utamaru, Kawasaki (JP)

(73) Assignee: KYOCERA CORPORATION, Kyoto (JP)

( * ) Notice: Subject to any disclaimer, the term of this patent is extended or adjusted under 35 U.S.C. 154(b) by 76 days.

(21) Appl. No.: 16/651,348

(22) PCT Filed: Sep. 26, 2018

(86) PCT No.: PCT/JP2018/035686
§ 371 (c)(1),
(2) Date: Mar. 27, 2020

(87) PCT Pub. No.: WO2019/065732
PCT Pub. Date: Apr. 4, 2019

(65) Prior Publication Data
US 2020/0236111 A1    Jul. 23, 2020

(30) Foreign Application Priority Data
Sep. 28, 2017   (JP) .................. 2017-188609

(51) Int. Cl.
*G06F 16/30*   (2019.01)
*G06F 16/27*   (2019.01)
*H04L 9/40*    (2022.01)

(52) U.S. Cl.
CPC .............. *H04L 63/10* (2013.01); *G06F 16/27* (2019.01)

(58) Field of Classification Search
CPC ........................................... G06F 16/27
See application file for complete search history.

(56) References Cited

U.S. PATENT DOCUMENTS

| | | |
|---|---|---|
| 2002/0059320 A1 | 5/2002 | Tamaru |
| 2003/0167150 A1 | 9/2003 | Shimura et al. |
| 2005/0133743 A1 | 6/2005 | Schets et al. |
| 2011/0087377 A1* | 4/2011 | Nabeshima ............ G05B 15/02 700/276 |
| 2012/0084359 A1 | 4/2012 | Mizutani |
| 2014/0218169 A1* | 8/2014 | Chih ........................ G05B 1/03 340/5.81 |

(Continued)

FOREIGN PATENT DOCUMENTS

| | | |
|---|---|---|
| JP | 2002-188183 A | 7/2002 |
| JP | 2005-182399 A | 7/2005 |

(Continued)

*Primary Examiner* — Khanh B Pham
(74) *Attorney, Agent, or Firm* — HAUPTMAN HAM, LLP (57) ABSTRACT

An equipment management system comprises a gateway apparatus having an interface configured to receive an operation command for operating an equipment, a first database configured to store first information allowed access from the gateway apparatus, a second database configured to store second information prohibited access from the gateway apparatus, and a controller configured to allow access to the first database from the gateway apparatus and prohibit access to the second database from the gateway apparatus. The second information includes equipment information collected from a control apparatus controlling the equipment.

11 Claims, 5 Drawing Sheets

(56) References Cited

U.S. PATENT DOCUMENTS

| | | | | |
|---|---|---|---|---|
| 2015/0026285 A1* | 1/2015 | Stabenow | ............ | H04L 67/141 |
| | | | | 709/207 |
| 2015/0120008 A1 | 4/2015 | Hashimoto et al. | | |
| 2015/0235642 A1* | 8/2015 | Nishikawa | ............ | H04L 12/282 |
| | | | | 704/249 |
| 2018/0074469 A1* | 3/2018 | Ishizaka | .................. | G06F 21/44 |
| 2019/0086114 A1* | 3/2019 | Nakashima | ............ | G05B 15/02 |
| 2019/0203969 A1* | 7/2019 | Kanamaru | ............... | F24F 11/30 |

FOREIGN PATENT DOCUMENTS

| | | | |
|---|---|---|---|
| JP | 2009193480 A | 8/2009 | |
| JP | 201121977 A | 2/2011 | |
| JP | 2012-123500 A | 6/2012 | |

\* cited by examiner

| INDEX INFORMATION | GUIDANCE INFORMATION | | | |
|---|---|---|---|---|
| | EQUIPMENT NAME | INSTALLATION INFORMATION | INSPECTION INFORMATION | USE INFORMATION |
| | | | | |
| | | | | |
| ... | ... | ... | ... | ... |

FIG. 4

| INDEX INFORMATION | EQUIPMENT NAME | SENSING DATA | ERROR CODE | STATISTICAL DATA | REFERENCE DATA | OPERATION HISTORY |
|---|---|---|---|---|---|---|
| | | | | | | |
| | | | | | | |
| | | | | | | |
| ... | ... | ... | ... | ... | ... | ... |

FIG. 5

| INDEX INFORMATION | FULL NAME OR NAME OF USER | USER ADDRESS | MAIL ADDRESS | PHONE NUMBER | CONTRACTOR INFORMATION | MAINTENANCE INFORMATION |
|---|---|---|---|---|---|---|
| | | | | | | |
| | | | | | | |
| | | | | | | |
| ... | ... | ... | ... | ... | ... | ... | ial Application No. PCT/JP2018/035686, filed Sep. 26, 2018, and claims priority based on Japanese Patent Application No. 2017-188609, filed Sep. 28, 2017.

EQUIPMENT MANAGEMENT SYSTEM AND EQUIPMENT MANAGEMENT METHOD

RELATED APPLICATIONS

The present application is a National Phase of International Application No. PCT/JP2018/035686, filed Sep. 26, 2018, and claims priority based on Japanese Patent Application No. 2017-188609, filed Sep. 28, 2017.

TECHNICAL FIELD

The present invention relates to an equipment management system and an equipment management method.

BACKGROUND ART

An equipment management system which manages various information about a plurality of equipment is known. Examples of the various information include basic information and maintenance information about the equipment. For example, the basic information includes: installation date, predetermined durable years, and rated power consumption. The maintenance information includes maintenance histories of the equipment (for example, Patent literature 1).

CITATION LIST

Patent Literature

Patent Literature 1: Japanese application publication No. 2005-182399

SUMMARY OF INVENTION

An equipment management system according to a first disclosure comprises a gateway apparatus having an interface configured to receive an operation command for operating an equipment, a first database configured to store first information allowed access from the gateway apparatus, a second database configured to store second information prohibited access from the gateway apparatus, and a controller configured to allow access to the first database from the gateway apparatus and prohibit access to the second database from the gateway apparatus. The second information includes equipment information collected from a control apparatus controlling the equipment.

An equipment management method according to a first disclosure comprises a step A of receiving, by a gateway apparatus, an operation command for operating an equipment, a step B of storing, in a first database, first information allowed access from the gateway apparatus, a step C of storing, in a second database, second information prohibit access from the gateway apparatus, a step D of allowing access to the first database from the control apparatus, and a step E of prohibiting access to the second database from the control apparatus. The second information includes equipment information collected from a control apparatus for controlling the equipment.

DESCRIPTION OF EMBODIMENTS

Recently, a gateway apparatus provided with a user interface such as a sound input interface attracts attention. From a viewpoint of improving the convenience of users, it is preferred to unlimitedly allow the gateway apparatus to access the information, which is managed by an equipment management system. On the other hand, from a viewpoint of restraining leakage of know-how information, etc., it is not preferred to unlimitedly allow the gateway apparatus to access the information, which is managed by the equipment management system.

The present disclosure provides an equipment management system and an equipment management method which enable appropriate running of access of a gateway apparatus.

Hereinafter, an embodiment will be described with reference to drawings. In the following description of drawings, the same or similar parts are denoted by the same or similar symbols.

However, it should be noted that the drawings are schematic and that dimensional ratios, etc. thereof are different from real ones. Therefore, specific dimensions, etc. should be determined in consideration of the following description. As a matter of course, the drawings include the parts at which mutual dimensional relations or ratios are different from one another.

Embodiment (Equipment Management System)

Figure 1:
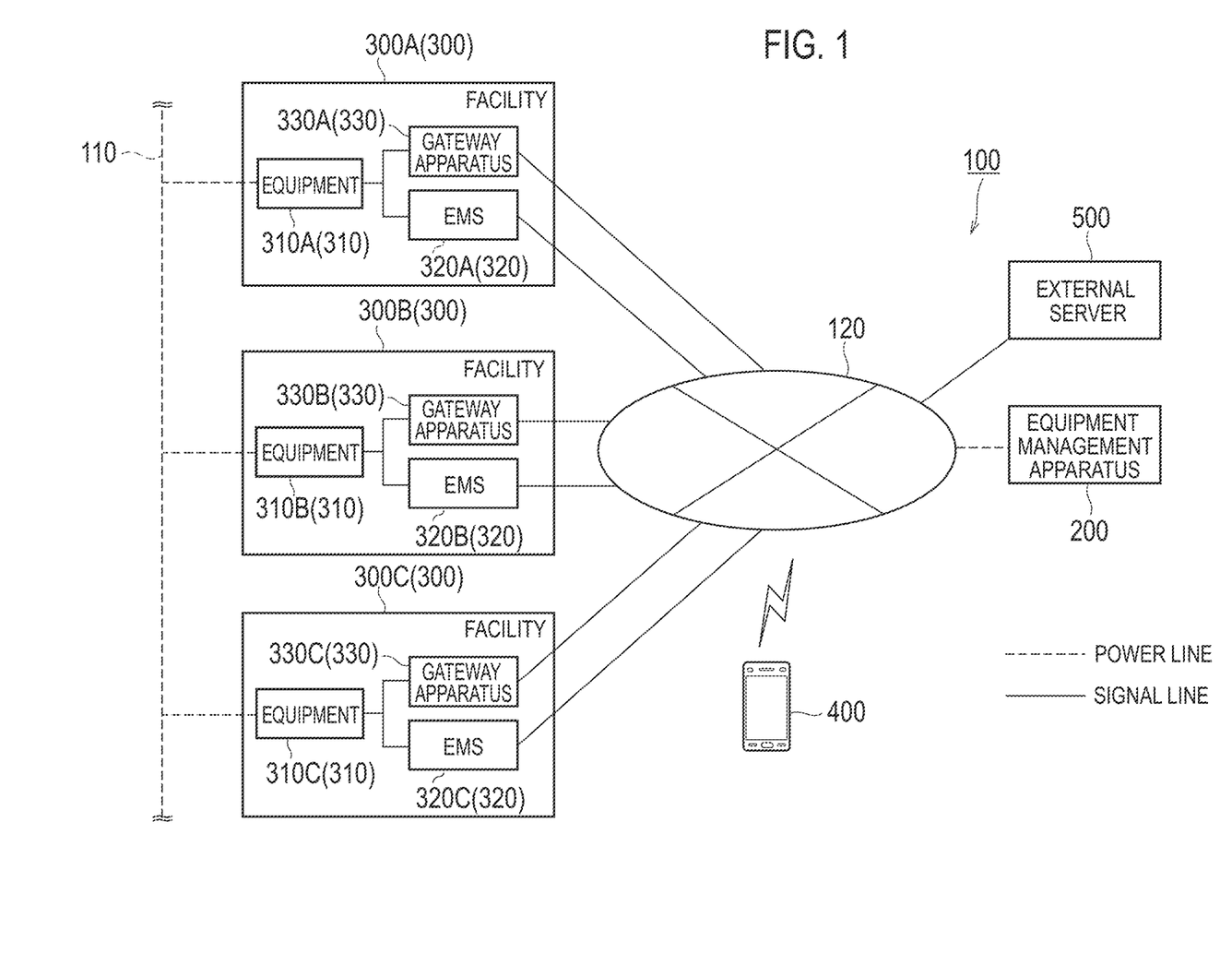
FIG. 1 is a drawing illustrating an equipment management system 100 according to an embodiment.

Hereinafter, an equipment management system according to the embodiment will be described. As illustrated in FIG. 1, the equipment management system 100 has an equipment management apparatus 200, facilities 300, a contractor terminal 400, and an external server 500. In FIG. 1, as the facilities 300, a facility 300A to a facility 300C are shown as examples. The equipment management apparatus 200, the facilities 300, the contractor terminal 400, and the external server 500 are connected to a network 120. The network 120 is only required to provide lines between the equipment management apparatus 200 and the facilities 300, a line between the equipment management apparatus 200 and the contractor terminal 400, and lines between the facilities 300 and the external server 500. For example, the network 120 is the Internet. The network 120 may provide a dedicated line such as a virtual private network (VPN).

The equipment management apparatus 200 manages equipment provided at the facilities 300. Details of the equipment management apparatus 200 will be described later (see FIG. 2).

The facility 300 has the equipment 310, an energy management system (EMS) 320, and a gateway apparatus 330. The equipment 310 is connected to a power grid 110. The equipment 310 may be a power generation equipment. The power generation equipment may be an equipment which generates power by using natural energy such as solar light, wind power, or geothermal heat. The power generation equipment may be a fuel cell apparatus. The equipment 310 may be a storage battery apparatus. The equipment 310 may be a load equipment, which consumes power. The load equipment may be an air-conditioning equipment or a lighting equipment. The facility 300 may have the equipment 310 of two or more types.

The EMS 320 is an apparatus (EMS: Energy Management System), which manages power information indicating power in the facility 300. The power in the facility 300 is the power which flows in the facility 300, the power bought by the facility 300, or the power sold by the facility 300.

The gateway apparatus 330 has an interface, which receives operation commands to operate the equipment 310. The interface may include a sound input interface. The interface may include a sound output interface. The interface may include a button input interface. The interface may include a touch-panel input interface. The interface may include a gesture input interface. A gesture is, for example, an action such as waving the hand toward a camera, which is owned by the interface. The interface may include an image output interface. The gateway apparatus 330 has an Artificial Intelligence (AI) function, and the AI function has a function to analyze operation commands and carries out various actions based on analysis results of the operation commands. The various actions may include an action of acquiring information from a server connected via the network 120 and may include an action of outputting information acquired from the server connected via the network 120. The server may be the equipment management apparatus 200 or may be the external server 500. The various actions may include an action of transmitting a control command based on an operation command or may include an action of receiving a response command for a control command. The gateway apparatus 330 may transmit the control command to the equipment 310 via the EMS 320 or may transmit the control command to the equipment 310 without the intermediation of the EMS 320. The gateway apparatus 330 may be called a smart speaker or AI.

Herein, the gateway apparatus 330 may transmit the information, which is collected by the gateway apparatus 330, to the external server 500. The information, which is collected by the gateway apparatus 330, may be analysis results of operation commands or may be the information acquired from the equipment management apparatus 200.

The contractor terminal 400 may be a terminal which belongs to a contractor that carries out maintenance of the equipment 310. Examples of the maintenance include: a checkup of examining the deterioration state of the equipment, upkeep of carrying out simple services during the checkup, repair of fixing problems of the equipment to recover the originally installed state of the functions and performance of the equipment, and replacement of exchanging the existing equipment for a new equipment.

Herein, the equipment management system 100 may have a power management server. For example, the power management server transmits, to the facility 300, a power-flow control message which requests control of the amount of the power flow from the power grid 110 to the facility 300, a reverse-power-flow control message which requests control of the amount of the reverse power flow from the facility 300 to the power grid 110, a power-source control message which requests control of the equipment 310 (distributed power supply) provided in the facility 300, and so on.

The external server 500 may be a server which provides a search engine for searching for required information based on the analysis result of the operation command. The external server 500 may be a server run by an entity, which provides the gateway apparatus 330. The external server 500 may manage the information, which is collected by the gateway apparatus 330, as big data and utilize the managed big data as the information for improving convenience of users.

(Equipment Management Apparatus)

Figure 2:
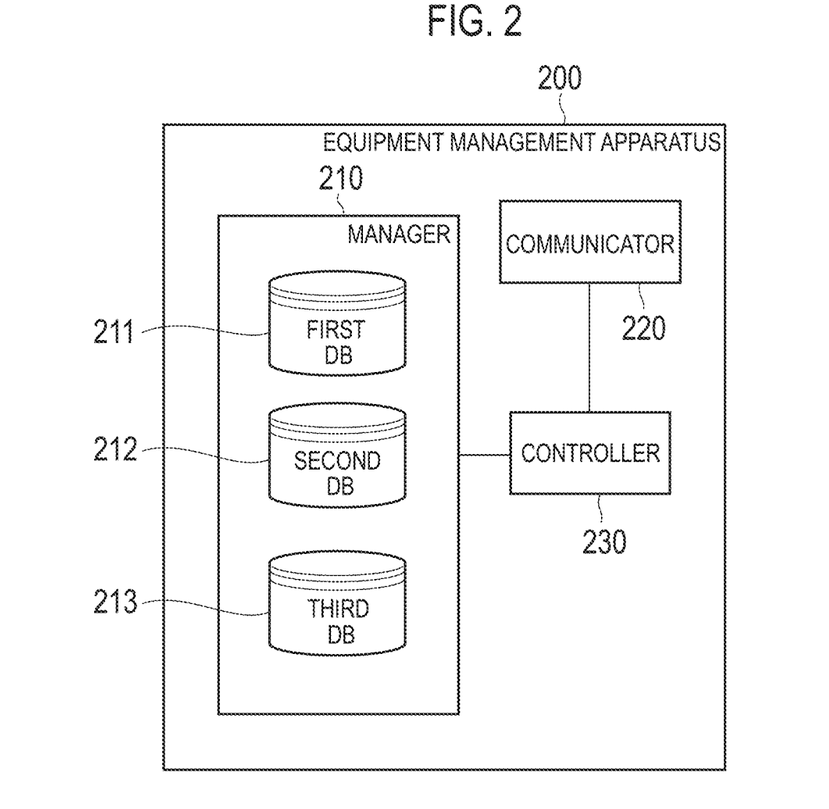
FIG. 2 is a drawing illustrating an equipment management apparatus 200 according to the embodiment.

Hereinafter, the equipment management apparatus according to the embodiment will be described. As illustrated in FIG. 2, the equipment management apparatus 200 has a manager 210, communicator 220, and a controller 230.

The manager 210 includes a storage medium (media) such as a non-volatile memory or/and a HDD and manages information about the plurality of facilities 300. The manager 210 has a first Database (DB) 211, a second Database (DB) 212, and a third Database (DB) 213.

Figure 3:
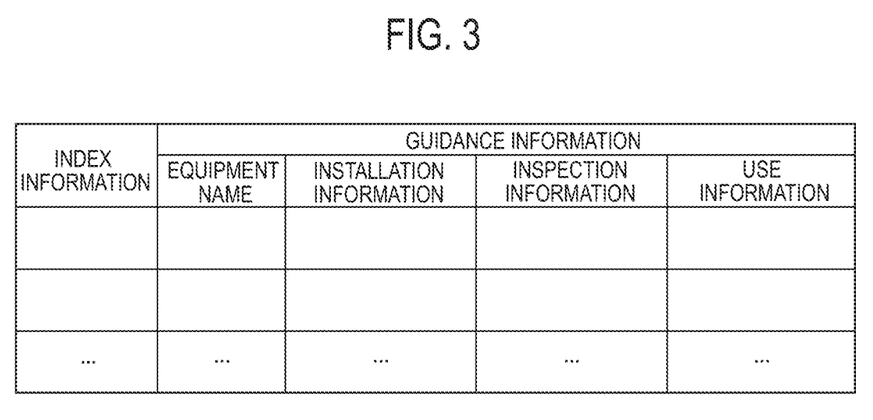
FIG. 3 is a drawing illustrating an example of information stored in a first DB 211 according to the embodiment.

The first DB 211 is an example of a first database storing first information, which allows access of the gateway apparatus 330. The first information includes guidance information about a handling method of the equipment. For example, the guidance information includes at least one of an equipment name, installation information, inspection information, and use information as illustrated in FIG. 3.

The equipment name is the name of the equipment 310. The equipment name may be the information (for example, a product model number, a manufacturer code) which uniquely identifies the equipment 310 or may be the information which indicates the type (for example, a solar battery apparatus, an air-conditioning equipment, etc.) of the equipment 310.

The installation information is the information required upon installation of the equipment 310 in the facility 300. For example, the installation information is the information indicating an installation procedure of the equipment 310 and is information such as: "Connect cable xx to terminal oo" or "Turn ON power". For example, the installation information may be used by an installation contractor of the equipment 310.

The inspection information is the information required upon inspection of the equipment 310. For example, the inspection information is the information indicating an inspection procedure of the equipment 310 and is information such as: "Is cable xx connected to terminal oo?" or "Is power lamp lighted?". For example, the inspection information may be used by an inspection contractor of the equipment 310. The inspection of the equipment 310 may be inspection carried out after installation of the equipment 310 or may be inspection carried out as upkeep of the equipment 310.

The use information is the information required upon usage of the equipment 310. For example, the use information is the information indicating a usage procedure of the equipment 310 and is information such as: "Turn ON power" or "Press button oo". The use information may be the information indicating functions of the equipment 310 or may be the information indicating troubleshooting of the equipment 310. The use information may be the information used by a user of the equipment 310.

In the embodiment, the first DB 211 may store index information which associates the guidance information, the equipment information, and the user information with one another as illustrated in FIG. 3. The index information includes a combination of arbitrary characters and numbers and is not required to have a meaning by itself.

Figure 4:
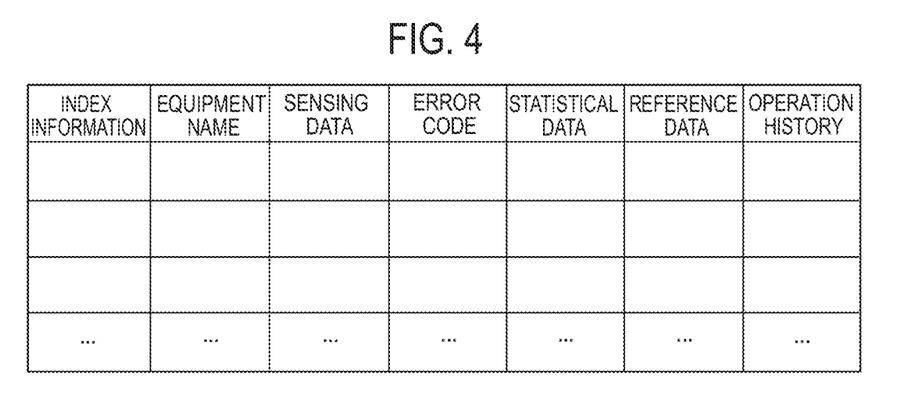
FIG. 4 is a drawing illustrating an example of the information stored in a second DB 212 according to the embodiment.

The second DB 212 is an example of a second database storing second information, which prohibits access of the gateway apparatus 330. The second information includes equipment information about the equipment 310. The equipment information is the information collected by the EMS 320, which controls the equipment 310. For example, the equipment information includes at least one of an equipment name, sensing data, an error code, statistical data, reference data, and a operation history as illustrated in FIG. 4.

The equipment name is the name of the equipment 310. The equipment name may be the information (for example, a product model number, a manufacturer code) which uniquely identifies the equipment 310 or may be the information which indicates the type (for example, a solar battery apparatus, an air-conditioning equipment, etc.) of the equipment 310.

The sensing data is the data including numerical data representing the operating state of the equipment 310. The sensing data is measured by a sensor provided at the facility 300. Alternatively, the sensing data may be measured by a sensor provided at the equipment 310 or may be measured by a sensor provided at the EMS 320. The sensing data is transmitted from the EMS 320 to the equipment management apparatus 200. For example, the sensing data may be output power data of the equipment 310, power consumption data of the equipment 310, temperature data of the equipment 310, environmental temperature data of the equipment 310, environmental humidity data of the equipment 310, or the like.

The error code is a code which identifies an error of the equipment 310. The error may be detected by the equipment 310 or may be detected by the EMS 320. The error code is transmitted from the EMS 320 to the equipment management apparatus 200. For example, the error code may be a code indicating an abnormality in the temperature of the equipment 310, a code indicating an abnormality in a part provided in the equipment 310, a code indicating an abnormality in output power of the equipment 310, a code indicating an abnormality in power consumption of the equipment 310.

The statistical data is the data obtained by statistical processing of numerical data. The statistical data may be generated by the equipment management apparatus 200. Alternatively, the statistical data may be generated by the equipment 310 or may be generated by the EMS 320. For example, the statistical data may be numerical data grouped or sorted for a particular purpose. The statistical data may be, for example, the data indicating the transition (profile) of output power of the equipment 310 in a predetermined period (for example, 1 day, 1 week, or 1 month) or the data indicating the transition of power consumption of the equipment 310 in a predetermined period.

The reference data is the data including a threshold value compared with the numerical data. The reference data is a value set by a manufacturer or the like of the equipment 310. The threshold value is a value used for determining the error of the equipment 310.

The operation history is the history about drive of the equipment 310. The operation history may be transitions of a drive mode in a predetermined period (for example, 1 day, 1 week, or 1 month), may be the number of times of execution of a predetermined drive mode, or may be the number of times driving of the equipment 310 stopped. For example, if the equipment 310 is a fuel cell apparatus, the operation history may be the number of times of normal stoppages of the fuel cell apparatus or may be the number of times of emergency stoppages of the fuel cell apparatus. If the equipment 310 is a storage battery apparatus, the operation history may be the number of times of charges of the storage battery apparatus, may be the charge time of the storage battery apparatus, may be the number of times of discharges of the storage battery apparatus, may be the discharge time of the storage battery apparatus, or may be the number of charge/discharge cycles of the storage battery apparatus.

In the embodiment, the second DB 212 may store index information which associates the guidance information, the equipment information, and the user information with one another as illustrated in FIG. 4. The index information includes a combination of arbitrary characters and numbers and is not required to have a meaning by itself.

Figure 5:
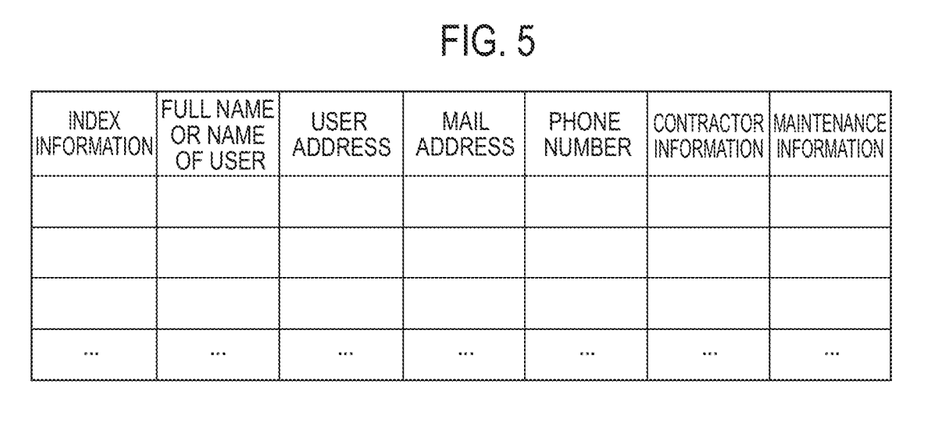
FIG. 5 is a drawing illustrating an example of information stored in a third DB 213 according to the embodiment.

The third DB 213 stores user information about users. The users may be legal persons or natural persons (individuals). For example, the user information includes at least one of the full names or names of the users, the addresses of the users, and contact information (mail addresses and phone numbers) of the users as illustrated in FIG. 5. The user information is the information to be protected. Furthermore, the user information may include at least one of contractor information and maintenance information as illustrated in FIG. 5.

The contractor information is the information about contractors which conduct transactions with users. The contractor may be a contractor which carries out maintenance. The contractor may be a manufacturer of the equipment 310. The contractor may be a company such as a power generation company, a company for power transmission and distribution, a retail company, or a resource aggregator.

The maintenance information is the information about maintenance of the equipment 310. The maintenance information may be a maintenance history or may be a maintenance schedule. The maintenance information may be accumulated by the maintenance information transmitted from the contractor terminal 400 or may be accumulated by the maintenance information input by an operator. The maintenance information may include the execution date of maintenance, the scheduled date of maintenance, and the contents of maintenance. As described above, the maintenance includes: for example, a checkup of examining the deterioration state of the equipment, upkeep of carrying out simple services during the checkup, repair of fixing problems of the equipment to recover the originally installed state of the functions and performance of the equipment, and replacement of exchanging the existing equipment for a new equipment.

In the embodiment, the third DB 213 may store index information which associates the guidance information, the equipment information, and the user information with one another as illustrated in FIG. 5. The index information includes a combination of arbitrary characters and numbers and is not required to have a meaning by itself.

The communicator 220 includes a communication module and communicates with the facilities 300 and the contractor terminal 400 via the network 120. For example, the communicator 220 receives the equipment information such as sensing data and error codes from the EMS 320. The communicator 220 receives the maintenance information from the contractor terminal 400. The communicator 220 receives the analysis results of the operation commands from the gateway apparatus 330.

The controller 230 includes, for example, a memory and a CPU and controls the configurations provided in the equipment management apparatus 200. In the embodiment, the controller 230 carries out the control shown below.

The controller 230 collects the equipment information from the EMS 320, which controls the equipment 310. The controller 230 may voluntarily collect the equipment information, which is transmitted from the EMS 320, or may collect the equipment information, which is transmitted from the EMS 320, in response to requests to the EMS 320. As described above, the equipment information is stored in the second DB 212.

The controller 230 allows the EMS 320 to access the second DB 212. On the other hand, the controller 230 prohibits the EMS 320 from accessing the third DB 213. In other words, the controller 230 is configured to prohibit the EMS 320 from accessing the third DB 213 even though the EMS 320 is allowed to access the second DB 212.

Similarly, the controller 230 may allow the contractor terminal 400 to access the second DB 212. On the other hand, the controller 230 may prohibit the contractor terminal 400 from accessing the third DB 213. In other words, the controller 230 may be configured to prohibit the contractor terminal 400 from accessing the third DB 213 even though the contractor terminal 400 is allowed to access the second DB 212.

The controller 230 may provide the equipment information to a third party. In such a case, the controller 230 deletes at least the index information. According to such a configuration, the risk that the user information might be leaked to the third party can be reduced. The third party is not particularly limited, but may be a company such as a power generation company, a company for power transmission and distribution, a retail company, or a resource aggregator.

In the present embodiment, the controller 230 allows the gateway apparatus 330 to access the first DB 211. On the other hand, the controller 230 prohibits the gateway apparatus 330 from accessing the second DB 212. In other words, the controller 230 is configured to prohibit the gateway apparatus 330 from accessing the second DB 212 even though the gateway apparatus 330 is allowed to access the first DB 211. Herein, the controller 230 may allow the gateway apparatus 330 to access the third DB 213 or may prohibit the gateway apparatus 330 from accessing the third DB 213. If a user who is allowed to access the third DB 213 inputs an operation command to the gateway apparatus 330, the controller 230 may allow the gateway apparatus 330 to access the third DB 213.

Herein, the user who inputs the operation command to the gateway apparatus 330 is conceivably a user of the equipment 310. Therefore, the user who inputs the operation command to the gateway apparatus 330 conceivably has the authority to access the second information (equipment information) stored in the second DB 212. For example, the user has the authority to access the second information via the EMS 320.

However, even if an access is based on an operation command derived from the user who has the authority to access the second information, the controller 230 prohibits the gateway apparatus 330 from accessing the second DB 212. In other words, the controller 230 prohibits the gateway apparatus 330 from accessing the second DB 212 while allowing the EMS 320 to access the second DB 212.

(Equipment Managing Method)

Hereinafter, an equipment management method according to the embodiment will be described.

Figure 6:
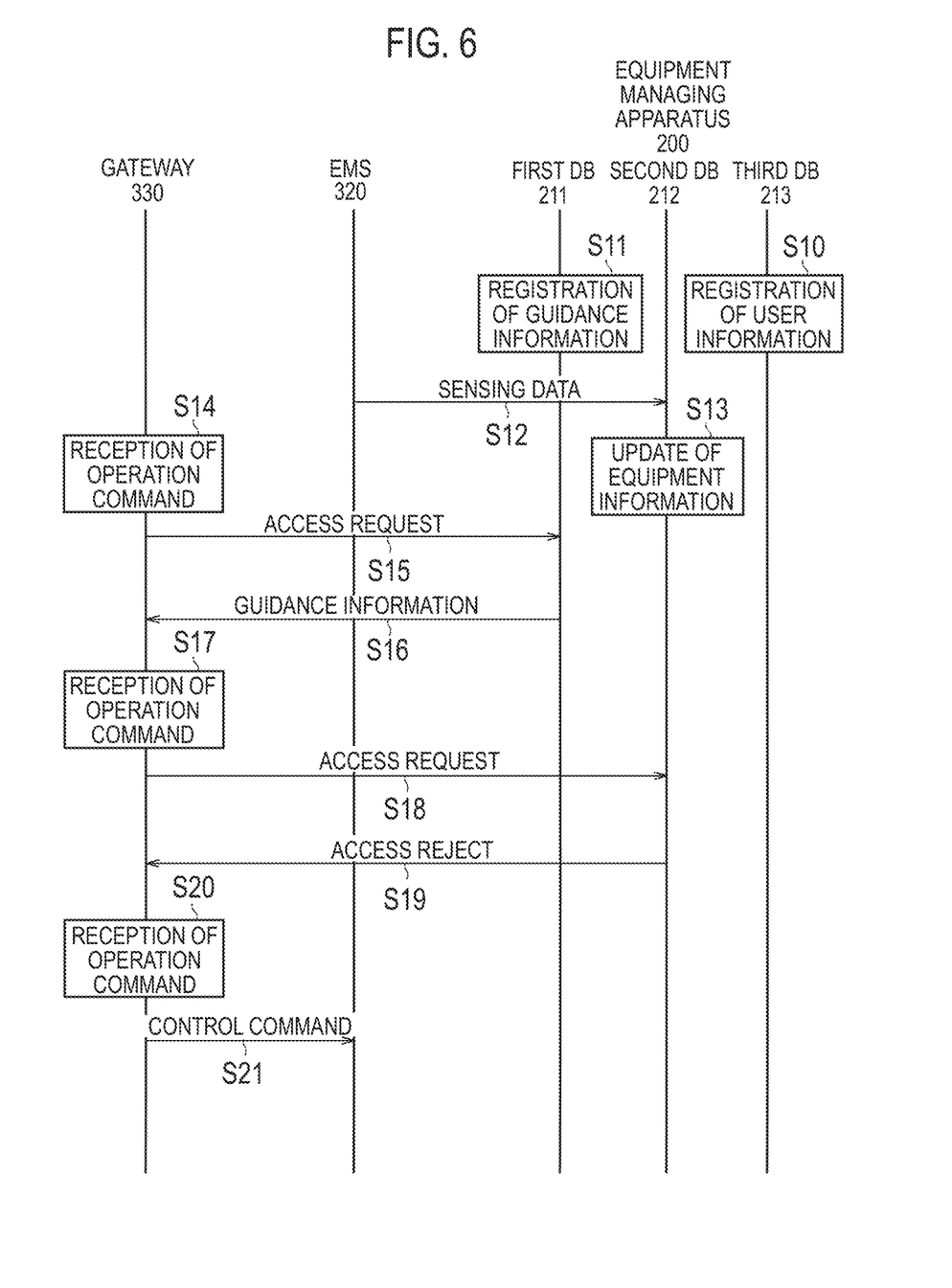
FIG. 6 is a drawing illustrating an equipment management method according to the embodiment.

As illustrated in FIG. 6, in step S10, the user information is registered in the third DB 213. The registration is carried out based on a contract or the like between an organizer of the equipment management apparatus 200 and a user of the equipment 310. The registration is carried out by an operator of the equipment management apparatus 200.

In step S11, the guidance information is registered in the first DB 211. The registration may be carried out before starting installation of the equipment 310 to the facility 300. The registration may be carried out at the timing when a sales contract of the equipment 310 is concluded. The registration may be carried out by the information acquired from a server run by the manufacturer of the equipment 310 or may be carried out by an operator of the equipment management apparatus 200.

In step S12, the EMS 320 accesses the second DB 212 and transmits the sensing data to the second DB 212. If an error of the equipment 320 is occurring, the EMS 320 may transmit an error code to the second DB 212.

In step S13, the equipment management apparatus 200 updates the equipment information, which is stored in the first DB 211, based on the sensing data. The equipment management apparatus 200 may update the equipment information, which is stored in the first DB 211, based on the error code. The equipment management apparatus 200 automatically generates the index information, which can associates the equipment information with the user information. The index information is stored in the second DB 212 and the third DB 213.

In step S14, the gateway apparatus 330 receives an operation command. In this case, the operation command is an order to request the guidance information. The operation command may be made by sound.

In step S15, the gateway apparatus 330 transmits an access request for the first DB 211 to the equipment management apparatus 200 based on an analysis result of the operation command.

In step S16, in response to the access request, the equipment management apparatus 200 transmits the guidance information to the gateway apparatus 330. The gateway apparatus 330 outputs the guidance information. The guidance information may be output by sound.

In step S17, the gateway apparatus 330 receives an operation command. In this case, the operation command is an order to request the equipment information. The operation command may be made by sound.

In step S18, the gateway apparatus 330 transmits an access request for the second DB 212 to the equipment management apparatus 200 based on an analysis result of the operation command.

In step S19, in response to the access request, the equipment management apparatus 200 transmits an access reject to the gateway apparatus 330. The gateway apparatus 330 may output the fact that the access to the second DB 212 is prohibited. Such information may be output by sound.

In such a case, the information output from the gateway apparatus 330 may be information such as "The gateway apparatus 330 is prohibited from accessing the second DB 212" or information such as "Access the second DB 212 from a user terminal". Alternatively, the gateway apparatus 330 may transmit a transfer request of the equipment information to the EMS 320, and the EMS 320 may transmit the equipment information, which is managed by the EMS 320, or the equipment information, which is acquired from the equipment management apparatus 200, to a user terminal without the intermediation of the gateway apparatus 330. In the case in which the transfer request of the equipment information is transmitted, the output of the fact that the access to the second DB 212 is prohibited may be omitted.

In step S20, the gateway apparatus 330 receives an operation command. In this case, the operation command is an order to request operation of the equipment 310.

In step S21, the gateway apparatus 330 transmits a control command, which is based on the operation command, to the EMS 320.

(Working and Effects)

In the embodiment, the equipment management apparatus 200 is configured to prohibit the gateway apparatus 330 from accessing the second DB 212. According to such a configuration, since the gateway apparatus 330, which may transmit various information to the external server 500, is prohibited from accessing the second DB 212, the risk that the second information belonging to the know-how of the entity, which runs the equipment management apparatus 200, might be leaked to another entity can be reduced.

In the embodiment, the equipment management apparatus 200 is configured to allow the gateway apparatus 330 to access the first DB 211. According to such a configuration, since part of the information stored in the equipment management apparatus 200 is provided, the convenience of users is improved.

Other Embodiments

The present invention has been described by the above described embodiment. However, the discussions and drawings forming part of this disclosure should not be construed to limit the present invention. According to this disclosure, various alternative embodiments, examples, and running techniques will be apparent to those skilled in the art.

In the embodiment, the first DB 211, the second DB 212, and the third DB 213 are physically different databases. However, embodiments are not limited thereto. The first DB 211, the second DB 212, and the third DB 213 may be formed by one database and virtually separated from one another by setting access authorities.

In the embodiment, the first DB 211, the second DB 212, and the third DB 213 are provided in the equipment management apparatus 200. However, embodiments are not limited thereto. At least any one of the first DB 211, the second DB 212, and the third DB 213 may be provided in a server connected to the equipment management apparatus 200 via the network 120.

Although it is not particularly mentioned in the embodiment, the functions of the equipment management apparatus 200 may be provided by a cloud service.

In the embodiment, the controller, which prohibits the gateway apparatus 330 from accessing the second DB 212, is provided in the equipment management apparatus 200. However, embodiments are not limited thereto. The controller, which prohibits the gateway apparatus 330 from accessing the second information, may be provided in the gateway apparatus 330. In other words, the gateway apparatus 330 may autonomously prohibit itself from accessing the second DB 212.

In the embodiment, a control apparatus which controls the equipment 310 is the EMS 320. However, embodiments are not limited thereto. The control apparatus may be the equipment 310 per se. The control apparatus may be a remote controller, which transmits control commands to the equipment 310.

It is not particularly mentioned in the embodiment, the equipment management apparatus 200 (controller 230) may set, for each entity which accesses the equipment information, the access authority of information elements included in the equipment information. For example, the equipment management apparatus 200 may allow the EMS 320 to access the sensing data and prohibit the contractor terminal 400 from accessing the sensing data. Alternatively, the equipment management apparatus 200 may allow the contractor terminal 400 to access the operation history and prohibit the EMS 320 from accessing the statistical data.

In the embodiment, the entities which access the equipment information are the EMS 320 and the contractor terminal 400. However, embodiments are not limited thereto. The entity may be a user terminal belonging to a user of the equipment 310. In such a case, the equipment management apparatus 200 may allow the user terminal to access the operation history and prohibit the user terminal from accessing the sensing data.

Although it is not particularly mentioned in the embodiment, the equipment information may include basic information such as installation date, predetermined durable years, and rated power consumption.

The invention claimed is:

1. An equipment management system comprising:
   a gateway apparatus configured to receive an operation command configured to operate an equipment from a user of the equipment;
   an equipment management apparatus configured to control the equipment and including
      a first database configured to store first information allowed access from the gateway apparatus; and
      a second database configured to store second information prohibited access from the gateway apparatus; and
   an energy management system,
   wherein
   the gateway apparatus includes a controller configured to
      allow access to the first database from the gateway apparatus; and
      while allowing the energy management system to access the second database, autonomously prohibit access to the second database from the gateway apparatus without interventions from the equipment management apparatus even when the user has an authority to access the second information, because of the gateway apparatus being a smart speaker which includes a sound input interface configured to receive the operation command by a sound input, and a sound output interface,
   the first information includes guidance information indicating a handling method of the equipment,
   the second information includes equipment information, and
   the gateway apparatus is configured to perform access to the first database and to acquire the guidance information from the first database.

2. The equipment management system according to claim 1, wherein the first database and the second database are databases physically different from each other.

3. The equipment management system according to claim 1, wherein the first database and the second database store index information associating the first information and the second information with each other.

4. The equipment management system according to claim 1, wherein the equipment information includes at least one of: sensing data including numerical data indicating a operating state of the equipment, an error code identifying an error of the equipment, statistical data obtained by statistical processing of the numerical data, reference data including a threshold value compared with the numerical data, and an operation history of the equipment.

5. The equipment management system according to claim 1, wherein the gateway apparatus is configured to transmit, to the control apparatus, a control command based on the operation command.

6. The equipment management system according to claim 1, wherein the gateway apparatus is configured to transmit, to an external server, information being collected by the gateway apparatus.

7. The equipment management system according to claim 1, wherein the controller is configured to prohibit access to the second database from the gateway apparatus even when the access is based on the operation command derived from the user having the authority to access the second information.

8. The equipment management system according to claim 1, further comprising:
a facility including the energy management system configured to manage power information indicating power in the facility,
wherein the controller is configured to:
in response to a first determination that the gateway apparatus receives a first operation command for requesting the first information, allow access to the first database from the gateway apparatus;
in response to a second determination that the gateway apparatus receives a second operation command for requesting the second information, autonomously prohibit access to the second database from the gateway apparatus without interventions from the equipment management apparatus; and
in response to receiving a third operation command for requesting operation of the equipment, transmit a control command based on the third operation command to the energy management system.

9. The equipment management system according to claim 1, wherein the controller is configured to, while allowing the energy management system to access the second database and in response to the operation command received by the gateway apparatus being made by a sound, autonomously prohibit access to the second database from the gateway apparatus without interventions from the equipment management apparatus even when the user has the authority to access the second information.

10. The equipment management system according to claim 1, wherein the energy management system is configured to collect the equipment information and transmit the equipment to the equipment management apparatus.

11. An equipment management method comprising:
receiving, by a gateway apparatus, an operation command configured to operate an equipment from a user of the equipment;
storing, in a first database of an equipment management apparatus, first information allowed access from the gateway apparatus, the equipment management apparatus controlling the equipment;
storing, in a second database of the equipment management apparatus, second information prohibited access from the gateway apparatus;
allowing, by a controller of the gateway apparatus, access to the first database from the gateway apparatus; and
while allowing an energy management system to access the second database, autonomously prohibiting, by the controller of the gateway apparatus, access to the second database from the gateway apparatus without interventions from the equipment management apparatus even when the user has an authority to access the second information, because of the gateway apparatus being a smart speaker which includes a sound input interface configured to receive the operation command by a sound input, and a sound output interface,
wherein
the first information includes guidance information indicating a handling method of the equipment,
the second information includes equipment information, and
the gateway apparatus performs access to the first database and acquires the guidance information from the first database.

* * * * *